(12) United States Patent
Moroz et al.

(10) Patent No.: US 8,054,456 B2
(45) Date of Patent: *Nov. 8, 2011

(54) METHOD AND SYSTEM FOR DETECTING RETROREFLECTORS

(75) Inventors: Stanley Albert Moroz, Waldorf, MD (US); Duane Allen Burchick, Sr., Fort Washington, MD (US); Andrew Paul Brosky, Hughesville, MD (US)

(73) Assignee: Cardinal Scientific, Inc., Waldorf, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/911,369

(22) Filed: Oct. 25, 2010

(65) Prior Publication Data

US 2011/0032520 A1      Feb. 10, 2011

Related U.S. Application Data

(63) Continuation of application No. 12/232,943, filed on Sep. 26, 2008, now Pat. No. 7,843,557.

(60) Provisional application No. 60/975,924, filed on Sep. 28, 2007.

(51) Int. Cl.
    *G01B 11/26*       (2006.01)

(52) U.S. Cl. ......................................................... 356/153
(58) Field of Classification Search .................. 356/153; 359/400

See application file for complete search history.

(56) References Cited

U.S. PATENT DOCUMENTS 6,204,961 B1 *   3/2001   Anderson et al. ............. 359/353
2007/0091319 A1   4/2007   Sonda et al.

FOREIGN PATENT DOCUMENTS

WO      2006091968 A2    8/2006

OTHER PUBLICATIONS

International Search Report dated Jan. 30, 2009 in corresponding international No. PCT/US2008/011264.

\* cited by examiner

*Primary Examiner* — Roy M Punnoose
(74) *Attorney, Agent, or Firm* — Maier & Maier, PLLC

(57) ABSTRACT

An optical device that may include a sighting portion including an optical axis; an electromagnetic beam source coupled to said sighting portion, electromagnetic beam source facilitates generating a source beam including an axis that is substantially parallel to said optical axis; an optical surface coupled to said electromagnetic beam source; and a frequency filter coupled within said sighting portion.

18 Claims, 2 Drawing Sheets

METHOD AND SYSTEM FOR DETECTING RETROREFLECTORS

CROSS-REFERENCE TO RELATED APPLICATIONS

This application is a continuation of U.S. patent application Ser. No. 12/232,943 entitled METHOD AND SYSTEM FOR DETECTING RETROREFLECTORS, filed Sep. 26, 2008 which claims priority to U.S. Provisional Patent Application No. 60/975,924, filed Sep. 28, 2007 entitled OPTICAL DEVICE, the entire contents of which are hereby incorporated by reference.

BACKGROUND OF THE INVENTION

Retroreflectivity is a term that describes an object's ability to reflect a wave front such as light, electro-magnetic waves or other forms of radiation back to the source along a path or vector that is substantially parallel to the vector of the source wave front path.

Retroreflectivity is a phenomenon that may occur in nature. One example of natural occurring retroreflectivity is the ability of an animal's eyes to reflect light such that the eyes appear to glow. This retroreflectivity occurs because the eyes of most animals include a focusing lens and a partially reflective layer of tissue near or part of the retina that is positioned substantially near a focal plane of the focusing lens. As a result, the eyes of animals may reflect a portion of the light entering the eye back to the light source on a path that is substantially parallel to the light source path. As such, objects that include a lens and a surface having some degree of reflectivity that is positioned substantially near a focal plane of the lens, may be defined as a retroreflector.

Retroreflectors may also be manufactured. Some examples of artificial retroreflective instruments include reflective highways signs, bicycle reflectors and corner reflectors. One known example of a corner reflector is a surveyor's reflecting prism that may be used with a surveyor's total station to calculate a distance between the total station and the prism. Other retroreflector examples may be optical instruments that include a lens and a surface that has a degree of reflectivity that is positioned substantially near a focal plane of the lens. Examples of such optical instruments may be rifle scopes, binoculars and cameras.

BRIEF DESCRIPTION OF THE INVENTION

In one exemplary embodiment, an optical device may be provided. The optical device may include a sighting portion including an optical axis; an electromagnetic beam source coupled to said sighting portion, electromagnetic beam source facilitates generating a source beam including an axis that is substantially parallel to said optical axis; an optical surface coupled to said electromagnetic beam source; and a frequency filter coupled within said sighting portion.

In another exemplary embodiment, a method of detecting retroreflectors using an optical device may be provided. The method may include generating an electromagnetic source beam that has a first frequency; shaping the electromagnetic source beam; channeling the shaped electromagnetic source beam towards a retroreflector; channeling a reflected shaped electromagnetic beam that is reflected by the retroreflector through a frequency filter; and displaying the reflected shaped electromagnetic beam.

In yet another embodiment, a means for detecting retroreflectors may be provided. The means may include a means for generating an electromagnetic source beam that has a first frequency; a means for shaping the electromagnetic source beam; a means for channeling the electromagnetic source beam towards at least one retroreflector; a means for filtering electromagnetic beams that have second frequencies that are substantially different than the first frequency of the electromagnetic source beam.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION OF THE INVENTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
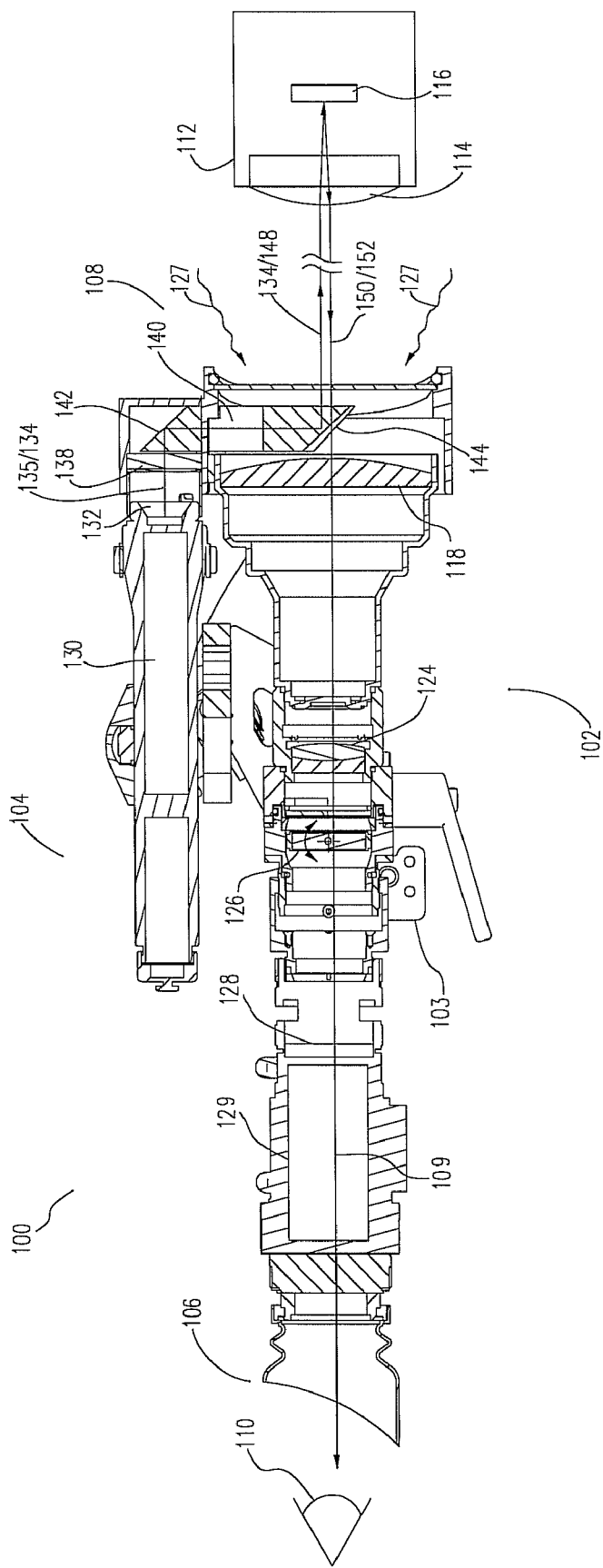
FIG. 1 is a cross-sectional side view of an optical device.
Figure 2:
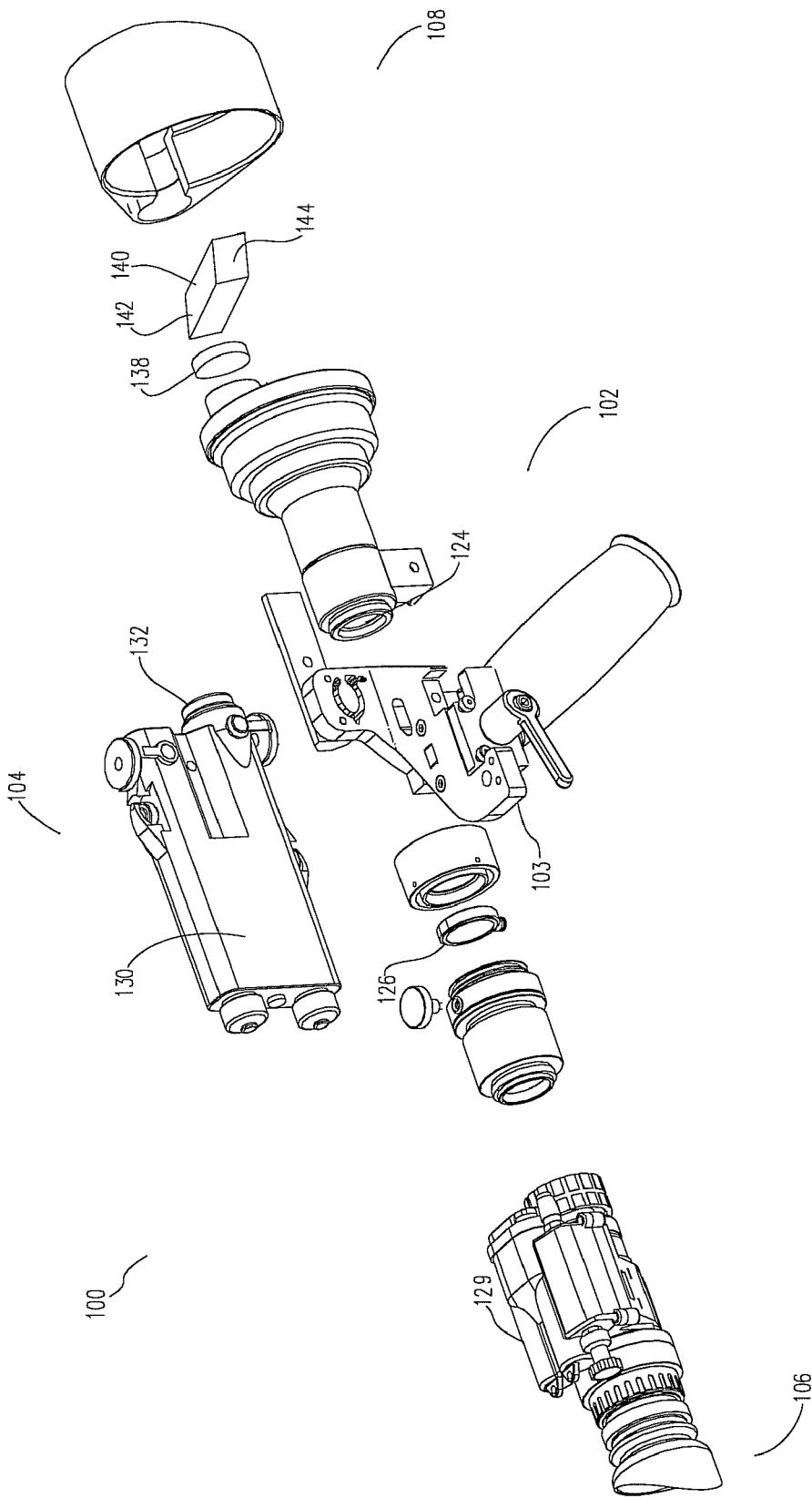
FIG. 2 is an exploded perspective view of the optical device shown in FIG. 1.

FIG. 1 is a cross-sectional side view of an optical device 100. FIG. 2 is an exploded perspective view of optical device 100. In one embodiment, optical device 100 may be configured for hand-held use. In another embodiment, optical device 100 may be configured for weapon-mounted applications, such as, but not limited to, a rifle scope. In yet another alternative embodiment, optical device 100 may be mounted on a stand such as, but not limited to, a tripod and/or any other type of support structure that enables optical device 100 to function as described herein. Alternative embodiments of optical device 100 may include, but not limited to, a sighting scope that includes a reticle, an automated gimbal mount for remote fixed-area scanning or vehicle mounting, a binocular configuration for visible and non-visible image assessment, imaged to a photoelectric transducer device for video display, output and automated image processing, and target designation illumination optimized for ambient energy intensity levels.

Optical device 100 may include a sighting portion 102 and an electromagnetic wave source, or laser source 104, coupled to sighting portion 102 using a chassis 103. In the exemplary embodiment, chassis 103 facilitates aligning laser source 104 with respect to sighting portion 102. Moreover, chassis 103 may facilitate coupling optical device 100 to other objects for mounting purposes. Sighting portion 102 may have a substantially cylindrical shape and include an ocular end 106, an objective end 108 and a centerline axis, or optical axis 109. Alternatively, sighting portion 102 may have any type of shape that enables optical device 100 to function as described herein. In the exemplary embodiment, ocular end 106 may face a user 110 and objective end 108 may face an objective, or target 112. For exemplary purposes of describing the exemplary embodiments of the present invention, target 112 in the exemplary embodiment may be a retroreflector such as, but not limited to, an optical scope, a camera and/or a pair of binoculars. More specifically, target 112 may include a lens 114 and a reflective surface 116 to facilitate retroreflecting electromagnetic waves back towards the wave source, as described in more detail below.

Sighting portion 102, and more specifically objective end 108, may include a first objective optical surface 118 that may be coupled within sighting portion 102. Sighting portion 102 may also include a second optical surface 124 that may be coupled therein, wherein second optical surface 124 may facilitate focusing the electromagnetic waves that are received through objective end 108 of optical device 100. Sighting portion 102 facilitates magnifying objects viewed by user 110 along optical axis 109 of sighting portion 102, wherein the objects may be positioned a distance downfield from optical device 100.

Moreover, sighting portion 102 may also include a band-pass filter 126 coupled therein, wherein band-pass filter 126 may be positioned adjacent second optical surface 124 such that the electromagnetic waves may be channeled from second optical surface 124 towards user 110, and more specifically, towards band-pass filter 126. In one embodiment, band-pass filter 126 may be tunable. In another alternative embodiment, band-pass filter 126 may be a rotatable tunable band-pass filter. In yet another alternative embodiment, band-pass filter 126 may be a fixed band-pass filter that may facilitate filtering a specific laser frequency. In the exemplary embodiment, band-pass filter 126 facilitates filtering, or preventing, a plurality of electromagnetic waves 127 that may have frequencies that do not substantially match the frequency set on the band-pass filter 126 from passing through band-pass filter 126. As a result, electromagnetic waves that have a frequency that substantially matches the frequency set on band-pass filter 126 may be channeled through band-pass filter 126 towards a photoelectric transducer 128, as described in more detail below. In the exemplary embodiment, band-pass filter 126 may be adjustable to enable user 110 to adjust, or select, which beam frequencies are filtered and which beam frequencies are not filtered.

Photoelectric transducer 128 may be positioned adjacent to band-pass filter 126 such that the electromagnetic waves that are channeled through band-pass filter 126 may impinge on photoelectric transducer 128, which facilitates generating an image that may be observed by user 110. In one embodiment, photoelectric transducer 128 may be a photocathode. Moreover, an image intensifier 129 may be coupled within sighting portion 102 and positioned adjacent photoelectric transducer 128 such that image intensifier 129 is positioned between ocular end 106 and photoelectric transducer 128.

Turning to laser source 104, in the exemplary embodiment, laser source 104 facilitates generating an electromagnetic wave, or beam. Specifically, laser source 104 may include a beam generation portion 130 and a beam emission end 132 coupled in communication with beam generation portion 130. Laser source 104 facilitates emitting a source beam 134 that may be channeled though beam emission end 132 such that source beam 134 may exit laser source 104 on a first source beam vector 135. In one embodiment, source beam 134 may be a collimated beam of electromagnetic wave energy. In another alternative embodiment, source beam 134 may be a non-collimated beam of electromagnetic energy. In yet another alternative embodiment, source beam 134 may be any type of beam or electromagnetic wave that enables optical device 100 to function as described herein.

In the exemplary embodiment, a shape forming optical surface 138 may be coupled to laser source 104 such that shape forming optical surface 138 may be positioned downfield from laser source 104. Shape forming optical surface 138 facilitates forming a shape of the source beam 134. In one embodiment, the shape of source beam 134 may be a substantially vertical stripe. Alternatively, shape forming optical surface 138 may facilitate forming any type of shape of source beam 134 that enables optical device 100 to function as described herein.

In one embodiment, a prism 140 may be coupled to both laser source 104 and sighting portion 102 to enable monostatic operation of optical device 100, as described in more detail below. Specifically, prism 140 may have a first end that has a first angled side 142 and a second end that has a second angled side 144. In one embodiment, prism 140 may have a substantially rhomboidal shape. Alternatively, prism 140 may have any shape that enables optical device 100 to function as described herein. In the exemplary embodiment, prism 140 may be oriented such that the first end may be positioned substantially within first source beam vector 135 and the second end may be positioned substantially within optical axis 109. Specifically, first and second angled sides 142 and 144 of prism 140 facilitate reflecting source beam 134 from first source beam vector 135 to a second source beam vector 148 that may be substantially co-axial with optical axis 109, as described in more detail below. It should be understood by a person having ordinary skill in the art that reflecting source beam 134 along second source beam vector 148 that may be substantially co-axial with optical axis 109 may be defined as monostatic operation.

In an alternative embodiment, optical device 100 may not include prism 140 such that laser source 104 may emit source beam 134 along first source beam vector 135 that may be substantially parallel to optical axis 109. It should be understood by a person having ordinary skill in the art that emitting source beam 134 along first source beam vector 135 that may be substantially parallel with optical axis 109 may be defined as bistatic operation.

During operation, a user may operate optical device 100 such that objective end 108 may face the potential target 112, which may be positioned downfield from user 110. User 110 may look through optical device 100 such that user 110 may look downfield along optical axis 109. User 110 may activate laser source 104 such that source beam 134 may be emitted therefrom. In one embodiment, laser source 104 emits a source beam that has a first frequency that is known to user 110. In another embodiment, source beam 134 may be either a visible beam or a non-visible beam.

During monostatic operation, source beam 134 may be channeled through shape forming optical surface 138 and then reflected by first angled side 142 of prism 140, which facilitates reflecting source beam 134 towards second angled side 144 of prism 140. Second angled side 144 facilitates reflecting source beam 134 along second source beam vector 148 that may be substantially co-axial to optical axis 109. Monostatic operation may facilitate detecting targets 112 that may be positioned at substantially close ranges with respect to optical device 100. Moreover, monostatic operation may also facilitate detecting targets 112 during the day when background radiation energy may be substantially higher than nighttime background radiation energy.

Alternatively, during bistatic operation, laser source 104 may emit source beam 134 such that source beam 134 may be channeled through shape forming optical surface 138 and then downrange along first source beam vector 135, wherein first source beam vector 135 may be substantially parallel to optical axis 109. Bistatic operation may facilitate reducing saturation of photoelectric transducer 128 during nighttime operation when the background radiation energy may be substantially lower than the daytime background radiation energy. As a result, the saturation of the image generated by photoelectric transducer 128 may be facilitated to be reduced.

Once laser source 104 is activated and channeling source beam 134 downfield, user 110 may move optical device 100 such that source beam 134 may sweep over objects positioned downfield in user's 110 field of view. In the event source beam 134 encounters retroreflecting target 112, a portion of source beam 134 may be reflected off reflective surface 116 and pass through lens 114 such that a reflected beam 150 is reflected back towards optical device 100 on a reflected beam vector 152 that may be substantially parallel to second source beam vector 148. Reflected beam 150 may then enter optical device 100 through objective end 106 and pass through prism 140. First objective optical surface 118 and second optical surface 124 facilitate channeling reflected beam 150 towards band-pass filter 126. In the exemplary embodiment, band-pass filter 126 may be set to the first frequency of source beam 134. As a result, band-pass filter 126 may channel electromagnetic waves that have frequencies substantially similar to the first frequency, such as reflected beam 150, through band-pass filter 126 such that the waves impinge on photoelectric transducer 128. Moreover, band-pass filter 126 facilitates filtering electromagnetic waves 127 that may have frequencies that are substantially different than the first frequency set on tunable band-pass filter. As a result, band-pass filter 126 facilitates reducing the amount of electromagnetic waves that may enter optical device 100.

Reflected beam 150 may then be channeled by band-pass filter 126 towards photoelectric transducer 128, wherein reflected beam 150 impinges thereon. Photoelectric transducer 128 facilitates generating a visual image (not shown) that may be observed by user 110. The visual image generated by photoelectric transducer 128 may be intensified by image intensifier 129. As a result, user 110 may observe reflected beam 150 using optical device 100. In such an event, user 100 may determine what type of object target 112 may be. For example, in one embodiment, user 110 may determine that target 112 is a bicycle or a street sign. In another example, however, user 110 may determined that target 112 is a pair of binoculars or a scope mounted on a weapon that may be facing user 110. As a result, optical device 100 enables user 110 to determine whether target 112 is a threat to user 110.

In the exemplary embodiment, source beam 134 may have a specific shape, such as but not limited to, a vertical stripe, as described above. In the event source beam 134 encounters a reflective object such as, but not limited to a bicycle reflector, source beam 134 may be reflected back towards optical device 100 as reflected beam 150, wherein reflected beam 150 may also have a shape that is substantially similar to the shape of source beam 134. The shape of source beam 134 facilitates confining the beam energy channeled downfield within a shape compared to a non-shaped source beam (not shown). For example, in one embodiment, the non-shaped source beam may be a substantially conical beam that may have a substantially larger beam area than a shaped beam. As a result, in the event the non-shaped source beam encounters a reflective object, a non-shaped reflected beam may be reflected back towards optical device 100, wherein the non-shaped reflected beam may have a substantially conical shaped beam that is substantially similar to the non-shaped source beam. Therefore, the reflected non-shaped beam may have a greater area of beam energy than shaped source beam 134. As such, photoelectric transducer 128 may generate an image of the non-shaped reflected beam that may have a visual area, or image footprint, that may obstruct the user's 110 view of the object when user 110 is looking through sighting portion 102. In such an example, photoelectric transducer 128 may generate an image of the non-shaped reflected beam that is either very bright or has a conical shape that may block the user's 110 view of the object. As a result, user 110 may not be able to accurately identify the reflecting object or more specifically, identify whether the reflecting object is a threat.

In the exemplary embodiment, shaped reflected beam 150 may have a vertical striped shape that enables user 110 to see target 112 through optical device 100 such that user 110 may determine whether target 112 is a threat to user 110. Specifically, shape forming optical surface 138 facilitates confining source beam 134 to a shape such as, but not limited to, a vertical stripe. As a result, in the event the shaped source beam 134 encounters a reflective object, shaped reflected beam 150 may be reflected back towards optical device 100. The shaped reflected beam 150 may have a smaller area of beam energy than the reflected non-shaped beam. As such, photoelectric transducer 128 may generate an image of shaped reflected beam 150 that may have a smaller visual area, or image footprint, than the image generated from the reflected non-shaped beam. As a result, the image generated from the shaped reflected beam 150 may not obstruct the user's 110 view of the object. Therefore, shaped reflected beam 150 enables user 110 to accurately identify the reflecting object, or more specifically, identify whether the reflecting object is a threat.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An optical device comprising:
   a sighting portion comprising an optical axis;
   an electromagnetic beam source coupled to said sighting portion, electromagnetic beam source facilitates generating a source beam comprising an axis that is substantially parallel to said optical axis;
   an optical surface coupled to said electromagnetic beam source; and
   a frequency filter including a tunable band-pass filter rotatably coupled within said sighting portion that facilitates tuning said frequency filter to a first frequency.

2. An optical device in accordance with claim 1 further comprising a prism removably coupled to said electromagnetic beam source and to said sighting portion, said prism comprises a plurality of angled sides that facilitate channeling said source beam along a source beam vector that is substantially co-axial with said optical axis.

3. An optical device in accordance with claim 1, wherein said optical surface comprises a lens that facilitates forming a shape of said source beam.

4. An optical device in accordance with claim 1, wherein said optical surface comprises a lens that facilitates forming a substantially vertical stripe shaped source beam.

5. An optical device in accordance with claim 1, wherein said electromagnetic beam source comprises an electromagnetic beam generator that facilitates emitting at least one of a collimated beam and a non-collimated beam.

6. An optical device in accordance with claim 1, wherein said electromagnetic beam source comprises an electromagnetic beam generator that facilitates generating a source beam that comprises a first frequency.

7. An optical device in accordance with claim 1, wherein said tunable band pass filter may be selectively rotated into or out of the optical axis.

8. An optical device in accordance with claim 7, wherein said tunable band-pass filter facilitates filtering electromagnetic waves that comprise a second frequency that is substantially different than said first frequency.

9. An optical device in accordance with claim 7, wherein said tunable band-pass filter facilitates channeling electromagnetic waves that comprise a first frequency that is substantially similar to said first frequency of said tunable band-pass filter.

10. An optical device in accordance with claim 1 further comprising a photoelectric transducer coupled to said sighting portion, said photoelectric transducer facilitates generating an image of a reflected beam.

11. An optical device in accordance with claim 1 further comprising an image intensifier that facilitates intensifying an image such that said image is observable by a user.

12. A method of detecting retroreflectors using an optical device, said method comprises:
   generating an electromagnetic source beam that has a first frequency;
   shaping the electromagnetic source beam;
   channeling the shaped electromagnetic source beam towards a retroreflector;
   channeling a reflected shaped electromagnetic beam that is reflected by the retroreflector through a frequency filter including selectively through a tunable band-pass filter; and
   displaying the reflected shaped electromagnetic beam.

13. A method in accordance with claim 12 further comprises shaping the electromagnetic source beam such that the electromagnetic source beam includes a substantially vertical stripe shape.

14. A method in accordance with claim 12 further comprises channeling the electromagnetic source beam on a first vector, wherein the first vector is substantially parallel with an optical axis of the optical device.

15. A method in accordance with claim 12 further comprises reflecting the source electromagnetic beam from a first vector to a second vector using a prism, wherein the second vector is substantially co-axial with an optical axis of the optical device.

16. A method in accordance with claim 12 further comprises:
   setting the frequency filter to a first frequency; and
   filtering a plurality of electromagnetic beams that include a plurality of second frequencies that are substantially different than the first frequency.

17. A method in accordance with claim 12 further comprising:
   generating an image using a photoelectric transducer; and
   displaying the image generated by the photoelectric transducer to the user using an image intensifier.

18. A method in accordance with claim 12 further comprising generating an electromagnetic source beam that has a first frequency, wherein the electromagnetic source beam is at least one of a collimated beam and a non-collimated beam.

* * * * *